(12) United States Patent
Matt et al.

(10) Patent No.: US 8,025,745 B2
(45) Date of Patent: Sep. 27, 2011

(54) DEVICE FOR THE THERMAL DEBURRING OF WORKPIECES

(75) Inventors: Patrick Matt, Marktoberdorf (DE); Axel Kieser, Ingersheim (DE)

(73) Assignee: Kennametal Inc., Latrobe, PA (US)

( * ) Notice: Subject to any disclaimer, the term of this patent is extended or adjusted under 35 U.S.C. 154(b) by 710 days.

(21) Appl. No.: 12/123,150

(22) Filed: May 19, 2008

(65) Prior Publication Data

US 2008/0308977 A1      Dec. 18, 2008

Related U.S. Application Data

(63) Continuation-in-part of application No. PCT/EP2006/011049, filed on Nov. 17, 2006.

(51) Int. Cl.
*B23K 7/00* (2006.01)
(52) U.S. Cl. .......................... 148/200; 266/249; 266/251
(58) Field of Classification Search .................. 148/200; 266/249, 251
See application file for complete search history.

(56) References Cited

U.S. PATENT DOCUMENTS 4,486,173 A      12/1984   Hieber

FOREIGN PATENT DOCUMENTS

DE            102 10 738         10/2003

OTHER PUBLICATIONS

International Search Report PCT/EP2006/011049 and English translation thereof.

*Primary Examiner* — Roy King
*Assistant Examiner* — Lois Zheng
(74) *Attorney, Agent, or Firm* — Matthew W. Smith

(57) ABSTRACT

A device for the thermal deburring of workpieces. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

2 Claims, 5 Drawing Sheets

BINARY GROUPS
    GROUP 1 = CHANNELS 1 - 3
    GROUP 2 = CHANNELS 4 - 6

| CHAMBER IDENTIFICATION - CHANNEL STATUS | | | | | | |
|---|---|---|---|---|---|---|
| CHAMBER TYPE | GROUP 1 | | | GROUP 2 | | |
|  | 1 | 2 | 3 | 4 | 5 | 6 |
| P80 - 120 | 0 | 0 | 1 | 0 | 0 | 1 |
| P80 - 150 | 0 | 1 | 0 | 0 | 1 | 0 |
| C200 - 200 | 0 | 1 | 1 | 0 | 1 | 1 |
| C200 - 250 | 1 | 0 | 0 | 1 | 0 | 0 |
| P350 - 250 | 1 | 0 | 1 | 1 | 0 | 1 |
| P350 - 320 | 1 | 1 | 0 | 1 | 1 | 0 |

DEVICE FOR THE THERMAL DEBURRING OF WORKPIECES

CONTINUING APPLICATION DATA

This application is a Continuation-in-Part application of International Patent Application No. PCT/EP2006/011049, filed on Nov. 17, 2006, which claims priority from Federal Republic of Germany Patent Application No. 10 2005 055 498.9, filed on Nov. 18, 2005. International Patent Application No. PCT/EP2006/011049 was pending as of the filing date of this application. The United States was an elected state in International Patent Application No. PCT/EP2006/011049.

BACKGROUND

1. Technical Field

This application relates to a device for the thermal deburring of workpieces.

2. Background Information

In thermal deburring plants, the workpieces to be deburred are accommodated in a combustion chamber. Once the combustion chamber is closed, a combustible gas mixture is introduced, for example an ignitable mixture of methane gas and oxygen. The mixing of the gas components usually takes place in a so-called mixing block, which is placed upstream of the combustion chamber. Serving for the introduction of the gas mixture is a gas supply duct, which opens directly into the combustion chamber in the usual manner. The gas mixture is ignited by a spark plug present in the mixing block. The flame front advances from the ignition point in the ignition channel of the mixing block via the gas supply duct into the combustion chamber and ignites the gas mixture present therein. The process is completed within just a few milliseconds. As a result of the heat given off, temperatures of up to 3,500° C. briefly occur in the combustion chamber. Following the ignition of the gas mixture, the pressure in the combustion chamber increases due to an isochoric reaction, which pressure increase is dependent on the charging pressure of the combustion chamber and the energy content of the gas mixture. Shortly after the ignition of the gas mixture in the combustion chamber, pressures in the order of magnitude of up to 1,000 bar can hereupon be generated due to the explosion. As a result of the resulting heat shock to which the workpieces are thereby exposed, the corners and edges thereof are eroded, since these points, with a large surface area and small volume, absorb a large amount of heat and are thus oxidized or burnt. In thermal deburring, the machining result to be obtained with respect to the workpiece is influenced by means of the quality (for example the mixing ratio) and the quantity (for example the charging pressure) of the gas mixture. A thorough and economical deburring of such workpieces is thereby possible without the need to use an expensive special tool or perform a tedious reworking by hand.

It is known that good and consistent results with respect to the deburring can only be realized if the correct composition of the combustible gas mixture with a predetermined charging pressure is present in the combustion chamber. This leads to sometimes considerable technical preparations having to be made to prepare the device for the thermal deburring for different workpieces.

In general, devices for treating a workpiece under a high pressure (of more than 200 bar, for example) normally have a machining chamber, which comprises a type of bell and a closing plate, which with a predefined closing pressure closes off an opening in the bell. The chamber is connected to a supply duct for supplying a fluid (liquid, gas, etc.) with a charging pressure and to the closing construction. During the machining, the closing plate is forced with a closing cylinder against the opening in the bell. The closing or clamping force is used to define the conditions in which the chamber, where necessary, is opened, for example when a destruction of the pressure vessel as a result of excessive charging pressures or the resulting explosion forces, and thus a threat to the environment, is to be feared. In many types of plant, this clamping force is kept constant. The counterforce resulting from the machining of the workpiece is dependent on the cross section of the chamber or bell, so that, specifically in the case of round chamber shapes or round openings which are closed with the closing plate, it is made easier to gear to the diameter thereof. This counterforce is quadratically dependent on the chamber diameter, so that, as the chamber diameter becomes larger, the maximally permitted charging pressure falls. This means with regard to the thermal deburring, for example, that combustion chambers having a large combustion chamber diameter are normally unsuitable for deburring small bores on workpieces, since the high energy per unit cross-sectional area of the combustion chamber which is necessary for this purpose can no longer be achieved. For such treatments of a workpiece under high pressure, respectively separate devices, each having a different chamber diameter and/or a different closing constructions, have hitherto been used.

For the thermal deburring of workpieces, safety devices, such as hydraulic pressure relief valves, may be installed to prevent the deburring chamber from exposure to pressures greater than its design limits. In the case of the present application, the setting of these safety devices is substantially dependent on the size of the deburring chamber, where size refers to the diameter of the deburring chamber. In other existing means of deburring workpieces, to change the size of chamber in use requires re-adjustment of the safety devices. However, the user of the machine may not be permitted to carry out this adjustment due to some type of restrictions, such as in Europe, for example, where the setting of the safety devices must be certified by an independent Notified Body. At least one possible embodiment of the present application may allow the user of the TEM machine to change the size of the deburring chamber without the assistance of the manufacturer and without the need for certification from a Notified Body. This may be achieved, in at least one possible embodiment of the present application, by having multiple safety devices on the device for thermal deburring of workpieces—one for each deburring chamber size that the customer wishes to use. In order to maintain the required level of safety, it must be ensured that the correct safety device is applied for each deburring chamber when installed in the machine. Therefore, a secure means of detecting the deburring chamber size installed and a secure means of selecting the compatible safety device are essential.

OBJECT OR OBJECTS

An object of at least one possible embodiment of the present application is to teach a device and a method for thermal deburring of workpieces. Another object of at least one possible embodiment of the present application is to teach device and a method for thermal deburring of workpieces, in which a device for thermal deburring can be operated with high flexibility and great economy. A further object of at least one possible embodiment of the present application is to teach device and a method for thermal deburring of workpieces, in which a very reliable method for operating such a device is defined.

SUMMARY

At least one possible embodiment of the present application teaches that these objects are achieved with a device for the thermal deburring of workpieces in a combustion chamber by means of a combustible gas mixture, in which device an apparatus for operating a plurality of combustion chambers of different combustion chamber diameter and means for controlling a supply of the gas mixture forward to a respective predetermined combustion chamber are provided. At least one possible embodiment of the present application teaches that these objects are achieved with a device for treating a workpiece under a pressure of at least 200 bar, having a chamber having a chamber diameter, the chamber being connectable to a supply duct for supplying a fluid with a charging pressure and to a closing plate, which with a closing pressure closes an opening in the chamber, in which device an apparatus for operating a plurality of chambers of different chamber diameter and means for controlling a supply of the fluid forward to a respective predetermined chamber are provided. At least one possible embodiment of the present application teaches that these objects are achieved with a method for operating a device for thermal deburring of workpieces by means of a combustible gas mixture, comprising the following steps: identification of a combustion chamber from a plurality of combustion chambers respectively having a predefined combustion chamber diameter, setting of an operating state of a metering unit for the gas mixture in dependence on the identified combustion chamber, feeding of the gas mixture forward to the combustion chamber, and performance of the thermal deburring. Developments of at least one possible embodiment of the present application are described herein. It should be pointed out that the features which are individually listed in the claims can be mutually combined in any chosen, technologically sensible manner and demonstrate further embodiments of the present application.

The device for the thermal deburring of workpieces in a combustion chamber by means of a combustible gas mixture is characterized in that an apparatus for operating a plurality of combustion chambers of different combustion chamber diameter and means for controlling a supply of the gas mixture forward to a respective predetermined combustion chamber are provided.

Accordingly, at least one possible embodiment of the present application departs from the notion that such a device shall respectively be operated with a single combustion chamber. In contrast to other existing devices and/or methods of thermal deburring of workpieces, it is here proposed to provide an apparatus for operating a plurality of combustion chambers of different combustion chamber diameter. By way of clarification, it is worth pointing out here that the "combustion chamber diameter" should be regarded as a blanket term for an expansion of the cross-sectional area of the combustion chamber, which is determinant for the machining and/or closing pressures. In this context, the embodiment in which at least 2, such as 3 or even 4, combustion chambers of different combustion chamber diameter can be operated is possible. The number of combustion chambers can be selected, for example, with due regard to the workpieces to be machined and/or the different combustible gas mixtures. Thus, the flexibility is increased, for example, in such a way that smaller combustion chambers can be used where small workpieces have to be machined with high charging pressure, e.g. in the deburring of small bores on the workpiece. The provision of a combustion chamber of small combustion chamber diameter has the effect that less of the combustible gas mixture is required, so that not only is a better machining result obtained, but at the same time less costs are incurred with regard to the deburring method. On the other hand, it is possible to resort to a different combustion chamber of larger combustion chamber diameter where, for example, burrs on large-volume die castings are to be eliminated or the quantitative use of the plant is intended to be increased to reduce the manufacturing costs per workpiece.

Noteworthy in this context is that appropriate means are provided for controlling a supply of the gas mixture forward to a respective predetermined combustion chamber. These means ensure a redundant and confusion-free control, so that, for example, predetermined quantities or pressures of the combustible gas mixture are fed only to the combustion chamber which is respectively suitable for this purpose. This means, inter alia, that these controlling means, in dependence on the combustion chamber to be used, clearly selects or provides the component parts of the device which are to be used or the pressures of the combustible gas mixture. These means for controlling a supply of the gas mixture could comprise sensors, valves, electronic control systems, and/or emergency switches.

According to an advantageous refinement of the device, these means also comprise identification means for clearly determining the combustion chambers and pressure-generating means for providing a predetermined pressure of the gas mixture in the predetermined combustion chamber. Within the framework of the identification means, switches for identifying the combustion chamber, sensors, or similar, for example, can be present. By a "predetermined" pressure is meant a "maximally permitted" charging pressure dependent on the predetermined combustion chamber, various charging pressures up to this maximum charging pressure possibly being able to be set.

These identification means can interact with a part of the combustion chamber, for example with its closing bell, closing plate, closing cylinder or the like. Means for recognizing the outer shape or of recognition means can also be provided on the combustion chambers, which interact with the identification means. The information obtained with the identification means is now coordinated with the operation of the pressure-generating means, so that, for example, the machining parameters predefined for the identified combustion chamber are set. A reliable, redundant recognition could be realized very easily, for example, by querying the type of sealing groove (for example, its diameter) in the closing plate. This could be checked prior to the actual machining, the redundant signal being fed to the identification means, which then purposefully influence the means for controlling the supply of the gas mixture. Specifically in plants which are already in operation, this can represent a cost-effective variant to retrofitting.

In at least one possible embodiment of the present application, the device has an exchange arrangement for a plurality of combustion chambers of different combustion chamber diameter, which interacts with identification means for clearly determining the combustion chambers. Such an exchange arrangement allows different combustion chambers to be able to be positioned roughly at the same site of the device. The exchange process can here be carried out partly or even fully automatically. In this context, it is also additionally proposed that (for example, in a fully automatic exchange device) the information with respect to the used combustion chamber is forwarded to the identification means.

According to a further embodiment of the device, a metering unit for the components of the combustible gas mixture is provided, which, in dependence on the predetermined combustion chamber, can assume different operating states. This means that the metering unit, which is part of the pressure-generating means for providing the predetermined pressure of the combustible gas mixture, has a certain number of modes, which are predetermined in dependence on the identified combustion chamber. It is thereby ensured or essentially ensured that the identified combustion chamber is operated only with the appropriate charging pressures. It should further be borne in mind that a single ignition channel or a single mixing block is thereby sufficient, since the structural parts up to the combustion chamber, which are disposed downstream of the metering unit, can be used irrespective of the used combustion chamber. The technical complexity involved in the manufacture and maintenance is thus markedly reduced.

In addition, it is also proposed in at least one possible embodiment of the present application that the metering unit can be operated with a hydraulic fluid and the hydraulic fluid can be provided in dependence on the predetermined combustion chamber. This means, for example, that the metering unit comprises a cylinder-piston unit, the piston being operated by the hydraulic fluid. As a result of the different provision of the hydraulic fluid, predetermined pressure states, displacement distances and similar can thus be set in the metering unit in a relatively redundant and confusion-free manner. The components of the combustible gas mixture which are portioned herewith or are subjected to pressure, are thus forwarded to the mixing block, or finally to the predetermined combustion chamber, in the desired quantitative and qualitative composition.

Accordingly, the metering unit is provided with a type of indirect pressure control, i.e. the safety valve in the respective hydraulic supply line of the metering unit is used to limit the force with which said metering unit pushes the gas into the combustion chamber, and thus, indirectly, the maximum possible charging pressure of the combustion chamber is limited. The setting of the respective working range for the workpieces can be realized either automatically via a machining program in the control system or manually by adjusting the stroke length of the metering cylinder.

In at least one possible embodiment of the present application, the hydraulic fluid can be fed via a plurality of supply lines, each having a directional valve, to a common metering unit, and the directional valves interact in such a way with an identification means for clearly or relatively clearly determining the combustion chambers that, during operation of the device, only one predetermined supply line is open. In other words, this also means that a supply line for the hydraulic fluid of the common metering unit is provided for each combustion chamber to be operated. Depending on which combustion chamber is currently due to be operated, precisely one of these hydraulic fluid supply lines is activated, whilst the others are shut off. For this, hydraulically working directional valves are used, which are respectively assigned to a supply line. These directional valves are switched in a redundant and confusion-free manner in dependence on the information acquired by the identification means. The hydraulic flow is controlled by means of these directional valves, so that the desired operating state of the common metering unit is set for the combustion chamber which is currently to be used.

Should the hydraulic fluid be fed via a plurality of supply lines to a common metering unit, in at least one possible embodiment of the present application these multiple supply lines respectively have a separate safety valve for limiting the charge pressure. The safety with respect to the operation of the common metering unit and the various combustion chambers is thereby further increased. Each safety valve is here tailored to the conditions in the respectively given supply line.

Safety devices may be incorporated into the hydraulic circuits of a thermal deburring device. Some functions that require these types of safety devices are the Dosing Cylinder Advance and the Closing Cylinder Clamp. On a standard device for thermal deburring, only one hydraulic pressure relief valve is needed for each of these functions. However, in the case of a thermal deburring device incorporating multiple combustion chambers, the hydraulic circuit must include a pressure relief valve for each chamber size. A directional control valve may be activated to select the correct pressure relief valve depending on the chamber size installed in the thermal deburring machine.

In at least one possible embodiment of the present application, a method for operating a device for the thermal deburring of workpieces by means of a combustible gas mixture is proposed, that comprises at least the following steps: identification of a combustion chamber from a plurality of combustion chambers respectively having a predefinable combustion chamber diameter, setting of an operating state of a metering unit for the gas mixture in dependence on the identified combustion chamber, feeding of the gas mixture forward to the combustion chamber, and performance of the thermal deburring.

The method, according to at least one possible embodiment of the present application, is used on a device as described herein.

The identification of the combustion chamber can be made automatically, for example by means of mechanical switches, magnetic, electrical or optical sensors, or similar. To this end, in at least one possible embodiment of the present application, the combustion chambers (bell, closing plate, etc.) have a clear or relatively clear determining feature, which can be evaluated in a generally redundant and confusion-free manner by suitable identification means.

In dependence on the identified combustion chambers, the operating states of the metering unit are now advantageously set fully automatically. This means that precisely the one hydraulic supply line which is now to be used to operate the metering unit is activated. The operating state of the metering unit is characterized by its maximally permitted charging pressure. The metering unit is thus capable, in dependence on the identified combustion chamber, of providing a charging pressure up to the respectively permissible maximum charging pressure. Should the metering unit be realized with a piston cylinder, the stroke length can be set to provide a gas mixture at the desired charging pressure (corresponding at most to the maximum charging pressure). This gas mixture is introduced via the mixing block into the deburring chamber or combustion chamber. Once the metering is completed, the supply lines are closed. The ignition of the gas mixture is realized, for example, by a spark plug placed in the ignition channel of the mixing block.

During the performance of the thermal deburring, heat (1,800° C. to 3,300° C.) is briefly generated in the combustion chamber, to which the workpieces residing therein are exposed. The heat is evacuated in the workpiece from the outside inwards. If a cross section on the workpiece, which has a very large area in relation to its material volume, is incapable of evacuating the arising energy into the inside of the structural part (for example a burr), this cross section is heated to the ignition temperature and oxidized by the oxygen. In other words, the gas mixture, ignited by the spark plug, creates an intense, rapid burst of heat. Burrs, because of their high ratio of surface area to mass, quickly raise to a temperature well above their auto-ignition point and burst into flames. Excess oxygen in the chamber combines with the vaporizing burrs to produce an oxide powder. As the oxidizing burr reaches the main body of the workpiece, the temperature drops rapidly and stops the process. The oxidation is of very short duration; long enough to transform burrs into oxide powder but not long enough to change the workpart dimensions or metallurgy.

The method is advantageous also by the fact that a choice of suitable combustion chamber can be made from a plurality of available combustion chambers in dependence on the workpiece to be used, for example. This is done, for example, with due regard to the operating parameters of the combustion chamber which are suitable for this workpiece and/or to the economical use of the combustible gas mixture.

The method is advantageous if the combustible gas mixture, in dependence on the identified combustion chamber, is provided at a predefined maximum charging pressure. By this is meant that the same combustible gas mixture can be used in each case, yet at a maximum charging pressure matched to the identified combustion chamber.

Advantageously, the device is refined such that means are provided for clearly limiting the closing force in dependence on the identified combustion chamber of the appropriate combustion chamber diameter. This offers the advantage, for example, that two force states could be altered simultaneously, i.e. with one identification signal the operating state of the metering unit and a corresponding operating state of the closing system could be set redundantly. The closing plate can thereby be guaranteed to open reliably, given a maximum pressure load which is predetermined for the combustion chamber.

According to a primary aspect of at least one possible embodiment of the present application, a device for treating a workpiece under a pressure of at least 200 bar is proposed, which has a chamber having a chamber diameter, the chamber being connectable to a supply duct for supplying a fluid with a charging pressure and to a closing plate which with a closing pressure closes an opening in the chamber, in which device an apparatus for operating a plurality of chambers of different chamber diameter and means for controlling a supply of the fluid forward to a respective predetermined chamber are provided. Possible further fields of application for this substantially reliable procedure in connection with the changeover of the chambers are advantageous where pressurized chambers are realized with a non-positive-locking closing device, which closing devices open in case of danger. An example, apart from explosion machining, could also be the machining of workpieces by means of pressurized abrasive media. It is possible that such a device is realized with appropriate features with respect to the forms of the supply lines for the hydraulic fluid, the identification means and/or their possible access to the respective supply lines of the hydraulic fluid, and/or the design of the metering unit.

With regard to the above-described device, simple modifications which are customary in plants for the fluidic treatment of workpieces can also be made. For instance, a chamber can be dispensed with if the workpiece or parts thereof themselves delimit the pressure chamber. For example, openings in the workpiece can then be closed with a type of closing plate and the fluid can be introduced with a charging pressure via further openings. In this case, too, a charging pressure and/or closing pressure limitation can be performed along the lines of the inventive approach.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Possible embodiments of the present application are explained in greater detail below with reference to the figures. It should be pointed out that the figures show possible embodiments of the present application, but the present application is not limited thereto. At least one possible embodiment of the present application will be described by means of the accompanying drawings, in which.

DESCRIPTION OF EMBODIMENT OR EMBODIMENTS

Figure 1:
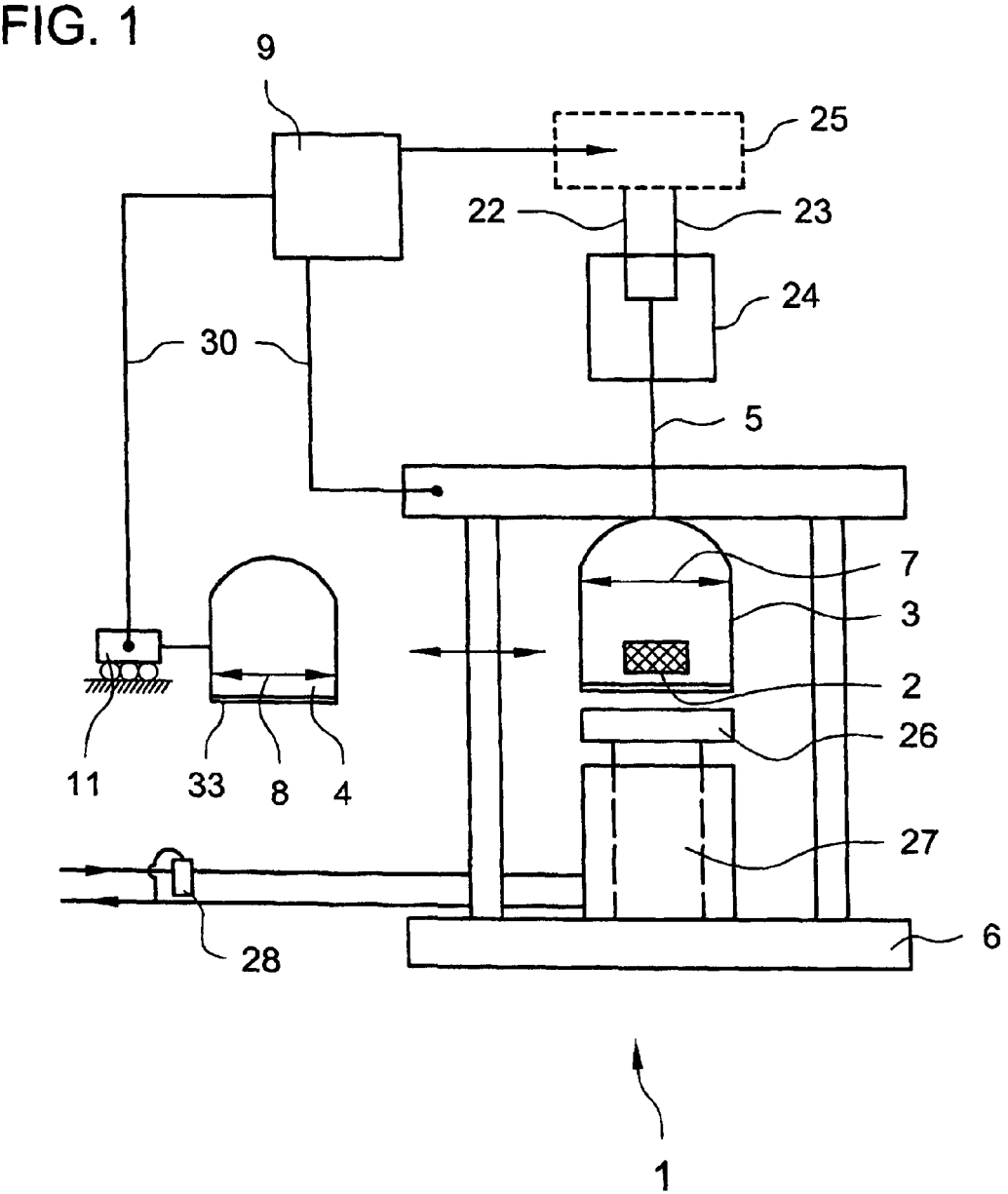
FIG. 1 shows an embodiment of a device for thermal deburring according to the present application.

FIG. 1 illustrates a possible structure for a device 1 for the thermal deburring of workpieces. The device 1 comprises an arrangement 6, in which a first combustion chamber 3 having a first combustion chamber diameter 7 is positioned together with the corresponding closing plate 26 and the closing cylinder 27. The closing plate 26 here interacts with a corresponding opening 33 in the combustion chamber 3 or in the so-called bell. This first combustion chamber 3 having the corresponding first combustion chamber diameter 7 is suitable for the machining of the workpiece 2 represented inside the first combustion chamber 3.

For the performance of the machining operation, the oxygen supply 22 and the combustible gas supply 23 is activated by means of the control unit 25, so that these components of the combustible gas mixture 5 is fed via the mixing block 24 into the interior of the first combustion chamber 3. The first combustion chamber 3, which during the machining operation is closed by means of the closing plate 26, then contains the desired quality and quantity of the combustible gas mixture 5, which is ignited by means of a spark plug (not represented here) provided in the mixing block 24. The closure of the first combustion chamber 3 is effected by the closing cylinder 27, which is hydraulically operated and is protected by means of a valve 28 against excessive charging pressures or explosion pressures.

If, in a following machining process, a differently shaped workpiece 2 is to be thermally deburred, in this device 1 for thermal deburring an exchange arrangement 11 is provided, which allows the first combustion chamber 3 to be replaced by a second combustion chamber 4 having a second combustion chamber diameter 8 (different from the first combustion chamber diameter 7). The closing plate 26 creates a sealed chamber when clamped to the open end of the combustion chambers 3. However, in other possible embodiments, a different size diameter of closing plate is required for each different size diameter of combustion chamber. Therefore, when a different size combustion chamber is used, then a different corresponding size closing plate must be used. In at least one possible embodiment of the present application, the determination of the size of closing plate to be used and the means of exchanging the closing plates can be accomplished by the same means as described herein for determining the size of combustion chamber to be used and the same means for exchanging the combustion chambers.

In principle, it is worth noting that this device 1 can be realized with further combustion chambers and/or exchange arrangements, the exchange arrangement also, if necessary, being manually operable, since identification means 9 are ultimately provided for identifying the combustion chamber about to be used. For this identification, the identification means 9 are connected by connections 30 to the arrangement 6 or the exchange arrangement 11, for example. The information acquired in the query with respect to the combustion chamber to be used is finally forwarded to the control unit 25. The identification should be made even prior to the actual machining of the workpiece to prevent increased cycle time. It is therefore possible, according to at least one possible embodiment of the present application, that the identification means interacts with a recognition station placed upstream of the actual machining station, so that the metering unit can already be prepared when the combustion chambers are still being exchanged. One possible structure of this control unit is illustrated in FIG. 2.

With regard to the use of a plurality of combustion chambers by means of the one device, combustion chambers having the following combustion chamber diameters are possible: 120 mm, 150 mm, 170 mm, 200 mm, 250 mm, 320 mm. Advantageously, the device has at least 2, 3 or even 4 such combustion chambers. Regarding these combustion chamber diameters, maximum charging pressures of about 16 bar, 23 bar, 25 bar and/or even 40 bar can be achieved, for example, by means of an appropriate control unit and/or metering unit.

Figure 2:
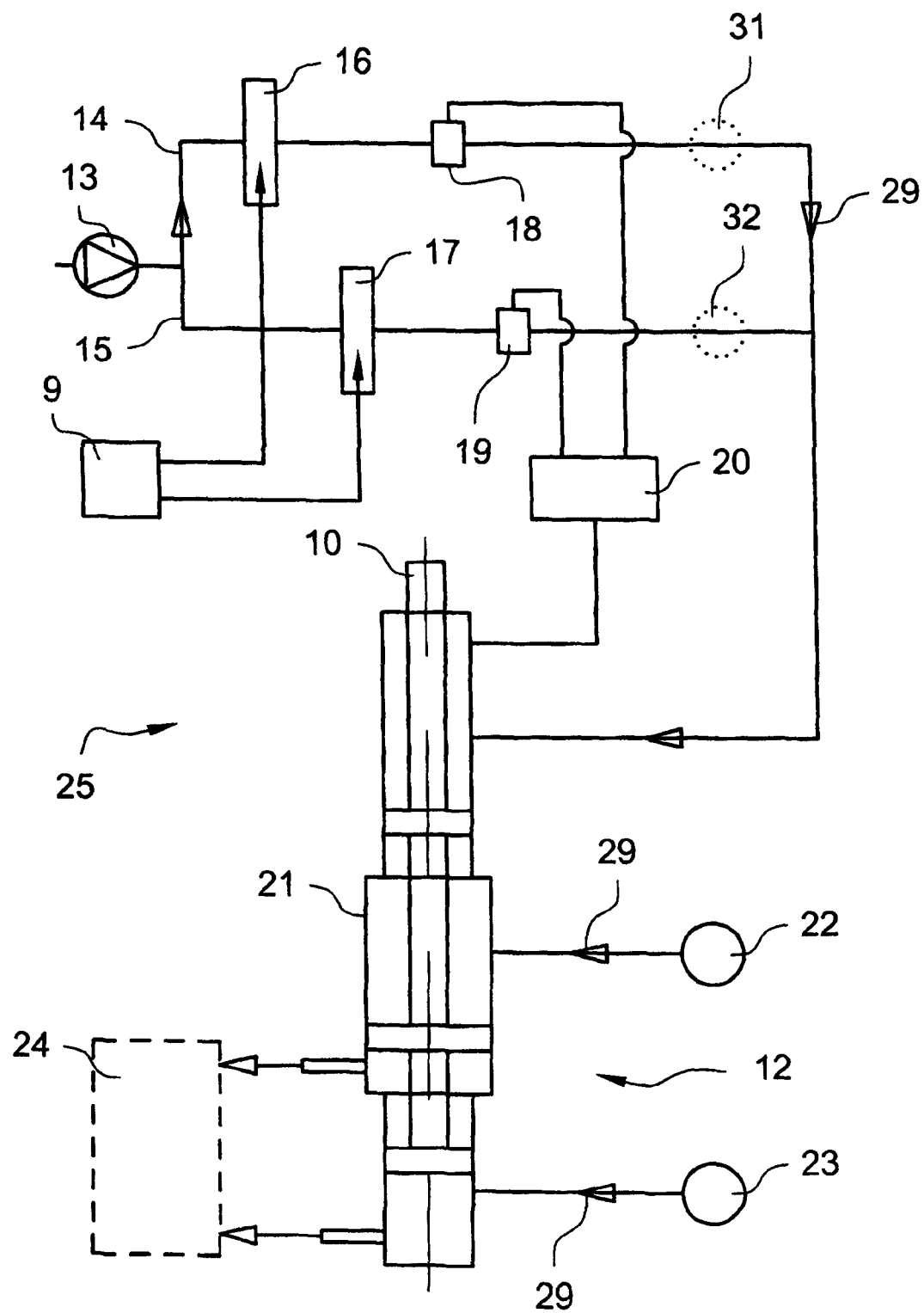
FIG. 2 shows an embodiment of the means for controlling a supply of the gas mixture.

FIG. 2 now illustrates at least one possible embodiment of the control unit 25 indicated in FIG. 1, which comprises the means for controlling a supply of the gas mixture 5 forward to the respectively predetermined combustion chamber.

Accordingly, an item of information is first passed by the identification means 9 to a first directional valve 16 or a second directional valve 17, these directional valves being part of separate first supply lines 14 and second supply lines 15 for a hydraulic fluid 13 for operating a common metering unit 12 for the components of the combustible gas mixture. In dependence on the identified combustion chambers, either the first supply line 14 or the second supply line 15 are accordingly opened by the identification means 9. As can be seen with reference to the represented flow direction arrows 29, in the embodiment which is shown here only the first supply line 14 is open.

The first supply line 14 accordingly has a first directional valve 16 for providing a desired pressure or a desired quantity of hydraulic fluid 13. Part of this first supply line 14 is, moreover, a first safety valve 18, which realizes a charge pressure limitation with respect to a first combustion chamber 3. In addition, the first supply line 14 can also additionally be provided with a first non-return valve 31.

The second supply line 15 is of substantially the same construction, i.e. comprises a second directional valve 17 and a second safety valve 19, as well as, if necessary, a second non-return valve 32. The structural parts in the second supply line 15 are here tailored to the charge pressure limitation or the combustion chamber diameter of the second combustion chamber 4.

Of course, if the device is operated with more than two combustion chambers, further supply lines can be provided in a similar manner. These supply lines or safety circuits have the aim of limiting the maximally generated loads during the thermal deburring. The permanent provision of these safety circuits, in combination with a redundant switch point for the activation thereof, allows a rapid and cost-effective exchange of combustion chambers. The device can thus be used very flexibly, whilst, at the same time, any prevailing safety regulations are constantly observed.

After the hydraulic fluid 13 is now fed via the first supply line 14 in this case to the common metering unit 12, which is here at the same time pressure-generating means 10 for providing a predetermined pressure of the combustible gas mixture 5 in the predetermined combustion chamber, the metering of the oxygen supply 22 and of the combustible gas supply 23 is effected in a predetermined manner. The oxygen and combustible gas portions which are necessary for the deburring operation are generated by means of the illustrated gas cylinder 21 and fed finally to the mixing block 24. From there, the gas mixture is introduced into the provided combustion chamber, so that the deburring operation can then be initiated.

Obvious modifications, for example with respect to the forms of the supply lines for the hydraulic fluid, the identification means and/or their possible access to the respective supply lines of the hydraulic fluid, the configuration of the metering unit and/or of the exchange arrangement 11, can readily be made.

Figure 2A:
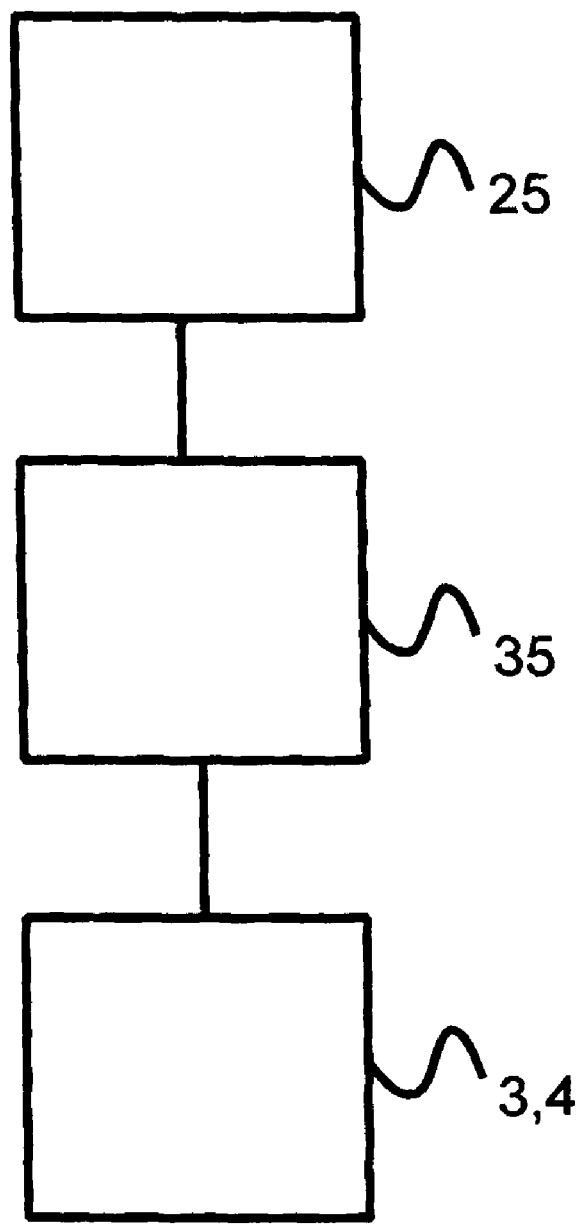
FIG. 2A is a block diagram that shows a spark plug ignition system according to one possible embodiment of the present application.

FIG. 2A shows a block diagram of one possible embodiment of the present application, which employs a spark plug ignition system 35 to ignite the combustible gas entering the combustion chambers 3, 4. The spark plug ignition system 35 shown here is connected to and receives instruction from the control unit 25.

Figure 3:
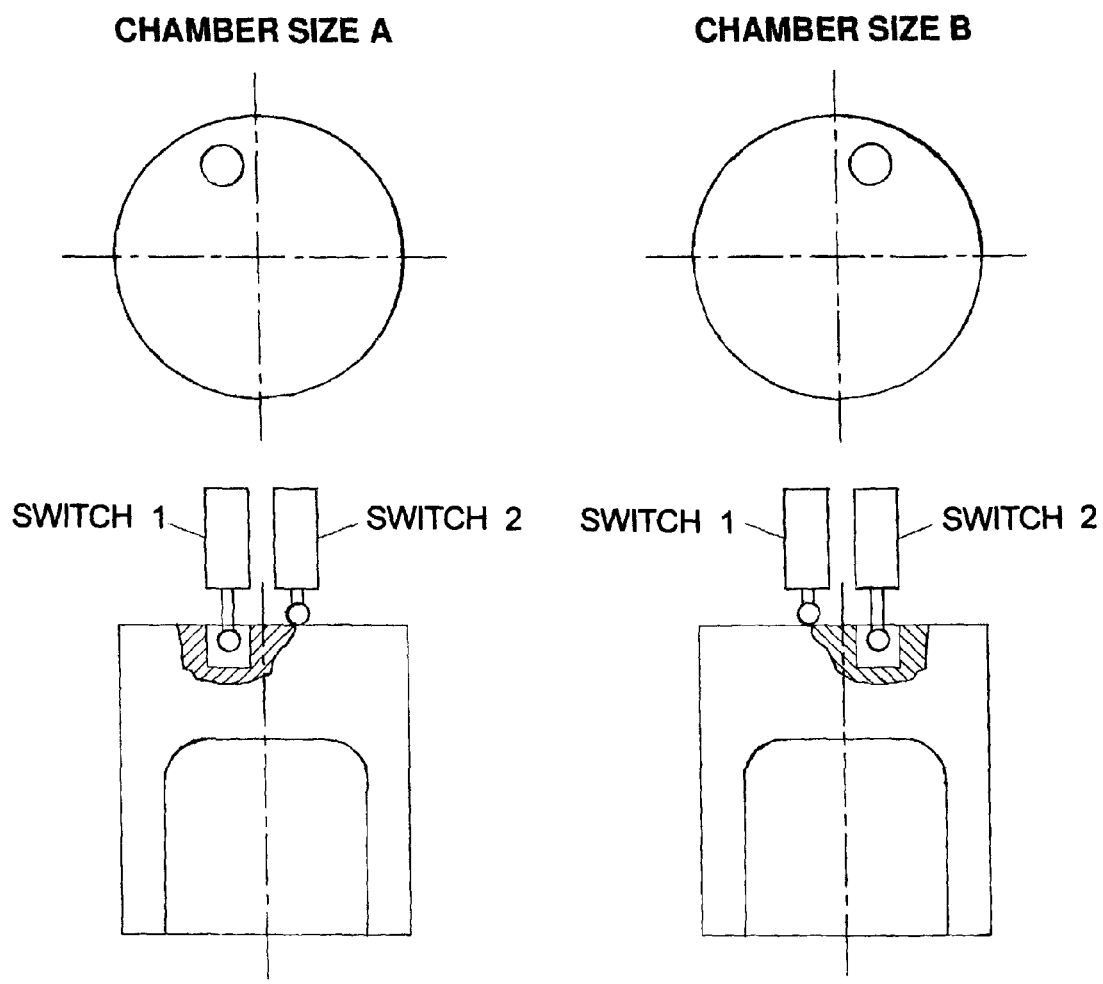
FIGS. 3 and 4 shows possible embodiment examples of a switching system that could be used to identify the size of the combustion chamber being used.
Figure 4:
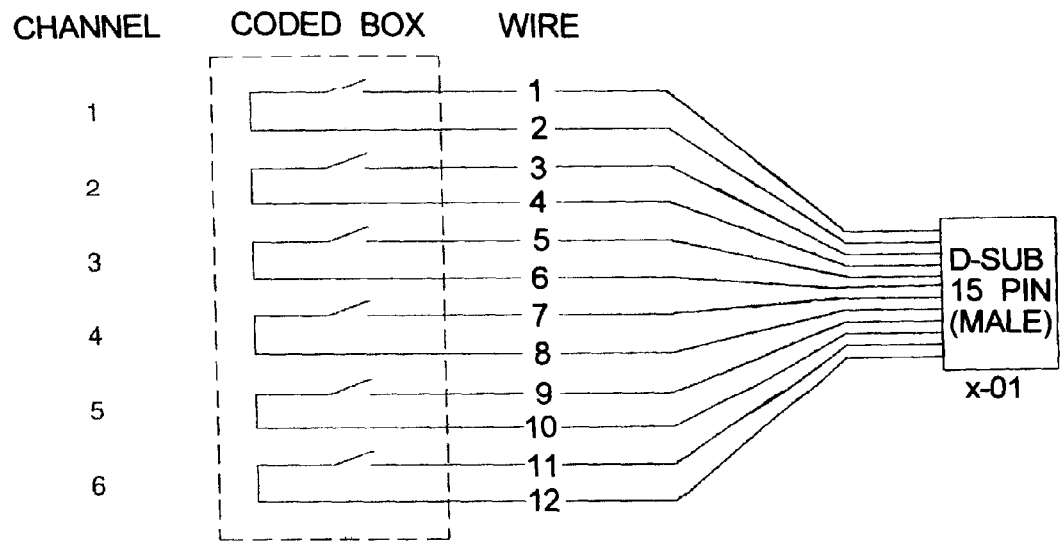

FIGS. 3 and 4 shows possible embodiment examples of a switching system that could be used to identify the size of the combustion chamber in the present application. FIG. 3 shows a series of either lever or plunger activated switches, which are mounted adjacent to deburring chambers. In at least one possible embodiment, the state of the switches, open or closed, is determined by features machined on the deburring chamber, and each different size of deburring chamber has uniquely machined features. In at least one possible embodiment of the present application, monitoring of the switches by the control unit 25 would allow determination of the size of combustion chamber installed in the arrangement 6.

FIG. 4 shows a coded electrical box, which is a sealed box containing a specified number of switches or channels encapsulated in resin. The encapsulation in resin prevents or essentially prevents tampering and protects or substantially protects the circuit from the vibratory effects of the deburring chamber. Each switch has two possible states, either open or closed, equivalent to a value of 1 or 0 when read by a control unit. In at least one possible embodiment example, each different size of deburring chamber could be assigned a unique pattern created by the state of each switch. Then, the control unit 25 could determine the size of chamber installed in the arrangement 6 based on the pattern. The table shown in FIG. 4 indicates possible patterns. In at least one possible embodiment of the present application, an electrical box could be secured to each chamber that will be used in the device for thermal deburring, and the electrical box could be further marked with a tamper proof seal.

At least one possible embodiment of the present application relates to a device for the thermal deburring of workpieces in a combustion chamber by means of a combustible gas mixture and to a method for operating said device.

An object of at least one possible embodiment the present application is to define a device and a method that at least partially solve the technical problems depicted with regard to the deburring of workpieces. In at least one possible embodiment the present application, a device and a method are intended to be defined, so that a device for thermal deburring can be operated with high flexibility and great economy. In addition, a very reliable method for operating such a device is intended to be defined.

One feature or aspect of an embodiment is believed at the time of the filing of this patent application to possibly reside broadly in a device 1 for the thermal deburring of workpieces 2 in a combustion chamber by means of a combustible gas mixture 5, in which device an apparatus 6 for operating a plurality of combustion chambers 3, 4 of different combustion chamber diameter 7, 8 and means for controlling a supply of the gas mixture 5 forward to a respective predetermined combustion chamber 3, 4 are provided.

The components disclosed in the various publications, disclosed or incorporated by reference herein, may possibly be used in possible embodiments of the present invention, as well as equivalents thereof.

Another feature or aspect of an embodiment is believed at the time of the filing of this patent application to possibly reside broadly in the device 1, in which the means comprise identification means 9 for clearly determining the combustion chambers and pressure-generating means 10 for providing a predetermined pressure of the combustible gas mixture 5 in the predetermined combustion chamber 3, 4.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Yet another feature or aspect of an embodiment is believed at the time of the filing of this patent application to possibly reside broadly in the device 1, in which an exchange arrangement 11 for a plurality of combustion chambers 3, 4 of different combustion chamber diameter 7, 8 is present, which interacts with identification means 9 for clearly determining the combustion chambers.

The appended drawings in their entirety, including all dimensions, proportions and/or shapes in at least one embodiment of the invention, are accurate and are hereby included by reference into this specification.

Still another feature or aspect of an embodiment is believed at the time of the filing of this patent application to possibly reside broadly in the device 1, in which a metering unit 12 for the components of the combustible gas mixture 5 is provided, which, in dependence on the predetermined combustion chamber 3, 4, can assume different operating states.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

A further feature or aspect of an embodiment is believed at the time of the filing of this patent application to possibly reside broadly in the device 1, in which the metering unit 12 can be operated with a hydraulic fluid 13 and the hydraulic fluid 13 can be provided in dependence on the predetermined combustion chamber 3, 4.

All, or substantially all, of the components and methods of the various embodiments may be used with at least one embodiment or all of the embodiments, if more than one embodiment is described herein.

Another feature or aspect of an embodiment is believed at the time of the filing of this patent application to possibly reside broadly in the device 1, in which the hydraulic fluid 13 can be fed via a plurality of supply lines 14, 15, each having a directional valve 16, 17, to a common metering unit 12, and the directional valves 16, 17 interact in such a way with an identification means 9 for clearly determining the combustion chambers that, during operation of the device 1, only one predetermined supply line 14, 15 is open.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Yet another feature or aspect of an embodiment is believed at the time of the filing of this patent application to possibly reside broadly in the device 1, the hydraulic fluid 13 being able to be fed via a plurality of supply lines 14, 15 to a common metering unit 12, in which the plurality of supply lines 14, 15 respectively have a separate safety valve 18, 19 for limiting the charge pressure.

All of the patents, patent applications and publications recited herein, and in the Declaration attached hereto, are hereby incorporated by reference as if set forth in their entirety herein.

Still another feature or aspect of an embodiment is believed at the time of the filing of this patent application to possibly reside broadly in a method for operating a device 1 for the thermal deburring of workpieces 2 by means of a combustible gas mixture 5, comprising the following steps: identification of a combustion chamber from a plurality of combustion chambers 3, 4 respectively having a predefined combustion chamber diameter 7, 8, setting of an operating state of a metering unit 12 for the gas mixture 5 in dependence on the identified combustion chamber, feeding of the gas mixture 5 forward to the combustion chamber, and performance of the thermal deburring.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

A further feature or aspect of an embodiment is believed at the time of the filing of this patent application to possibly reside broadly in the method, in which the combustible gas mixture 5, in dependence on the identified combustion chamber 3, 4, is provided at a predefined charging pressure.

It will be understood that any or all examples of patents, published patent applications, and other documents which are included in this application and including those which are referred to in paragraphs which state "Some examples of . . . which may possibly be used in at least one possible embodiment of the present application . . ." may possibly not be used or useable in any one or more or any embodiments of the application.

The sentence immediately above relates to patents, published patent applications and other documents either incorporated by reference or not incorporated by reference.

Another feature or aspect of an embodiment is believed at the time of the filing of this patent application to possibly reside broadly in a device for treating a workpiece under a pressure of at least 200 bar, having a chamber having a chamber diameter, the chamber being connectable to a supply duct for supplying a fluid with a charging pressure and to a closing plate, which with a closing pressure closes an opening 33 in the chamber, in which device an apparatus 6 for operating a plurality of chambers 3, 4 of different chamber diameter 7, 8 and means for controlling a supply of the fluid forward to a respective predetermined chamber 3, 4 are provided.

All of the patents, patent applications or patent publications, which were cited in the International Search Report dated Feb. 2, 2007, and/or cited elsewhere are hereby incorporated by reference as if set forth in their entirety herein as follows: U.S. Pat. No. 4,486,173 A and DE 102 10 738 A1.

The corresponding foreign and international patent publication applications, namely, Federal Republic of Germany Patent Application No. 10 2005 056 498.9, filed on Nov. 18, 2005, having inventors Patrick MATT and Axel KIESER, and DE-OS 10 2005 055 498.9 and DE-PS 10 2005 056 498.9, and International Application No. PCT/EP2006/0011049, filed on Nov. 17, 2006, having WIPO Publication No. WO2007/057199 A1 and inventors Patrick MATT and Axel KIESER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

A further feature or aspect of an embodiment is believed at the time of the filing of this patent application to possibly reside broadly in a method of operating a device for the thermal deburring of workpieces, said device comprising: a plurality of interchangeable combustion chambers; a closing system comprising: a plurality of interchangeable closing plates, each being configured to close a corresponding combustion chamber; and a closing cylinder; a frame structure being configured to receive one combustion chamber and its corresponding closing plate at a time therein; said frame structure comprising a closing cylinder being configured to move a closing plate disposed thereon to close a corresponding combustion chamber disposed in said frame structure; a source of combustible gas mixture; a control unit for controlling the measuring and issuance of the combustible gas mixture to each of said plurality of combustion chambers; said plurality of combustion chambers comprising at least a first combustion chamber having a first diameter and a second combustion chamber having a second diameter; said plurality of closing plates comprising at least a first closing plate being configured to contain the combustible gas mixture in said first combustion chamber; said plurality of closing plates comprising a second closing plate being configured to contain the combustible gas mixture in said second combustion chamber; identification unit being configured to recognize at least said first and said second combustion chambers comprising: a sensor configured to recognize and distinguish said at least said first and said second combustion chambers from one another; an arrangement configured to send signals from said sensor to said control unit; an exchange arrangement being configured to move individual combustion chambers into and out of said frame structure; and said control unit comprising: a hydraulic pressure metering unit; a plurality of supply lines being configured to deliver a desired pressure or desired quantity of hydraulic fluid to said metering unit based on the identification of at least said first combustion chamber and said second combustion chamber; said plurality of supply lines comprising at least a first supply line; said first supply line comprising: a first supply line directional valve configured to be used with said first combustion chamber; and a first supply line safety valve configured to realize a charge pressure limitation of said first combustion chamber; and a second supply line comprising: a second supply line directional valve configured to be used with said second combustion chamber; and a second safety valve configured to realize a charge pressure limitation of said second combustion chamber; and said method comprising the following steps: inputting: deburring requirements of all types of workpieces to be deburred by said device for thermal deburring of workpieces into said control unit; deburring capabilities of said at least said first and said second combustion chambers into said control unit; and maximum charging pressure of said metering unit in relation to closing force safety guidelines of said closing system based on maximum pressure load appropriate for said at least said first combustion chamber and said second combustion chamber; identifying workpieces to be deburred with said identification unit; sending signals to said control unit from said identification unit indicating said identification; determining which of said at least said first and said second combustion chambers to use for deburring with said control unit based on the requirements of the workpieces; selecting said first combustion chamber with said control unit and loading workpieces into said first combustion chamber; sending signals from said control unit to said identification unit; identifying said first combustion chamber having a first diameter with said sensor of said identification unit; determining appropriate maximum charging pressure of said metering unit based on identification of said first combustion chamber, and, at the same time, determining the safe closing force of said closing system based on identification of said first combustion chamber, both with said control unit; moving said first combustion chamber into said frame structure; delivering hydraulic fluid to said hydraulic pressure metering unit based on the identification of said first combustion chamber; delivering combustible gas to said first combustion chamber based on the identification of said first combustion chamber; moving said first closing plate, with said closing cylinder, to close said first combustion chamber and to contain said combustible gas mixture; igniting the combustible gas mixture to perform the thermal deburring; moving said first closing plate, with said closing cylinder, to open said first combustion chamber upon completion of the thermal deburring; moving said first combustion chamber out of said frame structure and unloading workpieces from said first combustion chamber; identifying workpieces to be deburred with said identification unit; sending signals to said control unit from said identification unit indicating said identification; determining which of said at least said first and said second combustion chambers to use for deburring with said control unit based on the requirements of the workpieces; selecting said second combustion chamber with said control unit and loading workpieces into said second combustion chamber; sending signals from said control unit to said identification unit; identifying said second combustion chamber having a second diameter with said sensor of said identification unit; determining appropriate maximum charging pressure of said metering unit based on identification of said second combustion chamber, and, at the same time, determining the safe closing force of said closing system based on identification of said second combustion chamber, both with said control unit; moving said second combustion chamber into said frame structure; delivering hydraulic fluid to said hydraulic pressure metering unit based on the identification of said second combustion chamber; delivering combustible gas to said second combustion chamber based on the identification of said second combustion chamber; moving said second closing plate, with said closing cylinder, to close said second combustion chamber and to contain said combustible gas mixture; igniting the combustible gas mixture to perform the thermal deburring; moving said second closing plate, with said closing cylinder, to open said second combustion chamber upon completion of the thermal deburring; and moving said second combustion chamber out of said frame structure and unloading workpieces from said second combustion chamber.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of apparatus for thermal deburring or methods of thermal deburring using a combustion chamber which may possibly be utilized or adapted for use in at least one possible embodiment may possibly be found in the following U.S. Pat. No. 6,713,016, entitled "System for thermally treating workpieces with an explosive gas mixture, in particular, a thermal deburring system", issued to Kaercher, et al. on Mar. 30, 2004; U.S. Pat. No. 4,740,152, entitled "Mixing block for mixing a combustible gas mixture", issued to Conrad, et al. on Apr. 26, 1988; U.S. Pat. No. 4,721,458, entitled "Gas feeding device for feeding a combustible gas mixture consisting of at least two components", issued to Conrad on Jan. 26, 1988; U.S. Pat. No. 4,712,998, entitled "Mixing arrangement for a combustible gas mixture", issued to Conrad on Dec. 15, 1987; U.S. Pat. No. 4,595,359, entitled "Apparatus for treating workpieces in a combustion chamber", issued to Conrad, et al. on Jun. 17, 1986; U.S. Pat. No. 4,561,839, entitled "Thermal deburring apparatus and method", issued to Neumann on Dec. 31, 1985; U.S. Pat. No. 4,487,576, entitled "High-temperature, high-pressure article treatment apparatus, and method", issued to Martini on Dec. 11, 1984; U.S. Pat. No. 4,486,173, entitled "High-temperature, high-pressure workpiece treatment system", issued to Hieber, et al. on Dec. 4, 1984; U.S. Pat. No. 4,474,547, entitled "Gas supply dosing device for explosive mixtures", issued to Drexel, et al. on Oct. 2, 1984; U.S. Pat. No. 4,388,083, entitled "Mixing block for explosive gas mixtures detonated in a combustion chamber", issued to Mauz on Jun. 14, 1983; U.S. Pat. No. 4,094,339, entitled "High temperature combustion shock deburring system", issued to Leisner, et al. on Jun. 13, 1978; U.S. Pat. No. 4,015,815, entitled "Contamination-resistant valve for high-temperature, high-pressure applications", issued to Leisner, et al. on Apr. 5, 1977; U.S. Pat. No. 3,994,668, entitled "Protectively doused valving device for a combustion chamber", issued to Leisner, et al. on Nov. 30, 1976; and U.S. Pat. No. 3,992,138, entitled "Apparatus for combustion chamber treatment of metal articles", issued to Leisner on Nov. 16, 1976.

Yet another feature or aspect of an embodiment is believed at the time of the filing of this patent application to possibly reside broadly in the device, wherein said device is configured to treat a workpiece under a pressure of at least 200 bar.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Some examples of thermal deburring or methods of thermal deburring using a combustion chamber and ignition systems with spark plugs for which may possibly be utilized or adapted for use in at least one possible embodiment may possibly be found in the following U.S. Pat. No. 4,721,458, entitled "Gas feeding device for feeding a combustible gas mixture consisting of at least two components", issued to Conrad on Jan. 26, 1988; U.S. Pat. No. 4,712,998, entitled "Mixing arrangement for a combustible gas mixture", issued to Conrad on Dec. 15, 1987; U.S. Pat. No. 4,595,359, entitled "Apparatus for treating workpieces in a combustion chamber", issued to Conrad, et al. on Jun. 17, 1986.

The details in the patents, patent applications and publications may be considered to be incorporable, at applicant's option, into the claims during prosecution as further limitations in the claims to patentably distinguish any amended claims from any applied prior art.

One feature or aspect of an embodiment is believed at the time of the filing of this patent application to possibly reside broadly in a device for the thermal deburring of workpieces comprising: a plurality of interchangeable combustion chambers; a plurality of interchangeable closing plates, each being configured to close a corresponding combustion chamber; a frame structure being configured to receive one combustion chamber and its corresponding closing plate at a time therein; said frame structure comprising a closing cylinder being configured to move a closing plate disposed thereon to substantially close a corresponding combustion chamber disposed in said frame structure; a source of combustible gas mixture; a control unit for controlling the measuring and issuance of the combustible gas mixture to each of said plurality of combustion chambers; said plurality of combustion chambers comprising a first combustion chamber having a first diameter and a second combustion chamber having a second diameter; said plurality of closing plates comprising a first closing plate being configured to substantially contain the combustible gas mixture in said first combustion chamber; said plurality of closing plates comprising a second closing plate being configured to substantially contain the combustible gas mixture in said second combustion chamber; identification means being configured to recognize said first and said second combustion chambers; an exchange arrangement being configured to move individual combustion chambers into and out of said frame structure; and said control unit comprising: a metering unit; a plurality of supply lines being configured to deliver a desired pressure or desired quantity of hydraulic fluid to said metering unit based on the identification of said first combustion chamber and said second combustion chamber; a first supply line comprising: a first directional valve configured to be used with said first combustion chamber; and a first safety valve configured to realize a charge pressure limitation of said first combustion chamber; and a second supply line comprising: a second directional valve configured to be used with said second combustion chamber; and a second safety valve configured to realize a charge pressure limitation of said second combustion chamber.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE 1 device
2 workpiece
3 first combustion chamber
4 second combustion chamber
5 gas mixture
6 apparatus
7 first combustion chamber diameter
8 second combustion chamber diameter
9 identification means
10 pressure-generating means
11 exchange arrangement
12 metering unit
13 hydraulic fluid
14 first supply line
15 second supply line
16 first directional valve
17 second directional valve
18 first safety valve
19 second safety valve
20 tank
21 gas cylinder
22 oxygen supply
23 combustible gas supply
24 mixing block
25 control unit
26 closing plate
27 closing cylinder
28 valve
29 flow direction arrow
30 connection
31 first non-return valve
32 second non-return valve
33 opening

What is claimed is:

1. A method of operating a device for thermal deburring of workpieces, said device comprising:
   a plurality of interchangeable combustion chambers;
   a closing system comprising:
      a plurality of interchangeable closing plates, each being configured to close a corresponding combustion chamber; and
      a closing cylinder;
   a frame structure being configured to receive one combustion chamber and its corresponding closing plate at a time therein;
   said frame structure comprising a closing cylinder being configured to move a closing plate disposed thereon to close a corresponding combustion chamber disposed n said frame structure;
   a source of combustible gas mixture;
   a control unit for controlling the measuring and issuance of the combustible gas mixture to each of said plurality of combustion chambers;
   said plurality of combustion chambers comprising at least a first combustion chamber having a first diameter and a second combustion chamber having a second diameter;
   said plurality of closing plates comprising at least a first closing plate being configured to contain the combustible gas mixture in said first combustion chamber;
   said plurality of closing plates comprising a second closing plate being configured to contain the combustible gas mixture in said second combustion chamber;
   identification unit being configured to recognize at least said first and said second combustion chambers comprising:
      a sensor configured to recognize and distinguish said at least said first and said second combustion chambers from one another;
      an arrangement configured to send signals from said sensor to said control unit;

an exchange arrangement being configured to move individual combustion chambers into and out of said frame structure; and said control unit comprising:
- a hydraulic pressure metering unit;
- a plurality of supply lines being configured to deliver a pressure or a quantity of hydraulic fluid to said metering unit;
- said plurality of supply lines comprising at least a first supply line;
  - said first supply line comprising:
    - a first supply line directional valve configured to be used with said first combustion chamber; and
    - a first supply line safety valve configured to realize a charge pressure limitation of said first combustion chamber; and
  - a second supply line comprising:
    - a second supply line directional valve configured to be used with said second combustion chamber; and
    - a second safety valve configured to realize a charge pressure limitation of said second combustion chamber; and said method comprising the following steps:
- inputting:
  - deburring requirements of all types of workpieces to be deburred by said device for the thermal deburring of workpieces for thermal deburring of workpieces into said control unit;
  - deburring capabilities of said at least said first and said second combustion chambers into said control unit; and
  - charging pressure of said metering unit;
- identifying workpieces to be deburred with said identification unit;
- sending signals to said control unit from said identification unit indicating said workpiece identification;
- determining which of said at least said first and said second combustion chambers to use for deburring with said control unit based on the requirements of the workpieces;
- selecting said first combustion chamber with said control unit and loading workpieces into said first combustion chamber;
- sending signals from said control unit to said identification unit;
- identifying said first combustion chamber having a first diameter with said sensor of said identification unit;
- determining a charging pressure of said metering unit based on identification of said first combustion chamber, and, at the same time, determining a closing force for said closing system based on identification of said first combustion chamber, both with said control unit;
- moving said first combustion chamber into said frame structure;
- delivering hydraulic fluid to said hydraulic pressure metering unit based on the identification of said first combustion chamber;
- delivering combustible gas to said first combustion chamber based on the identification of said first combustion chamber;
- moving said first closing plate, with said closing cylinder, to close said first combustion chamber and to contain said combustible gas mixture;
- igniting the combustible gas mixture to perform the thermal deburring;
- moving said first closing plate, with said closing cylinder, to open said first combustion chamber upon completion of the thermal deburring;
- moving said first combustion chamber out of said frame structure and unloading workpieces from said first combustion chamber;
- identifying additional workpieces to be deburred with said identification unit;
- sending signals to said control unit from said identification unit indicating said additional workpiece identification;
- determining which of said at least said first and said second combustion chambers to use for deburring with said control unit based on the requirements of the additional workpieces;
- selecting said second combustion chamber with said control unit and loading said additional workpieces into said second combustion chamber;
- sending signals from said control unit to said identification unit;
- identifying said second combustion chamber having a second diameter with said sensor of said identification unit;
- determining a charging pressure of said metering unit based on identification of said second combustion chamber, and, at the same time, determining a closing force for said closing system based on identification of said second combustion chamber, both with said control unit;
- moving said second combustion chamber into said frame structure;
- delivering hydraulic fluid to said hydraulic pressure metering unit based on the identification of said second combustion chamber;
- delivering combustible gas to said second combustion chamber based on the identification of said second combustion chamber;
- moving said second closing plate, with said closing cylinder, to close said second combustion chamber and to contain said combustible gas mixture;
- igniting the combustible gas mixture to perform the thermal deburring;
- moving said second closing plate, with said closing cylinder, to open said second combustion chamber upon completion of the thermal deburring; and
- moving said second combustion chamber out of said frame structure and unloading workpieces from said second combustion chamber.

2. The method of operating a device for the thermal deburring of workpieces according to claim 1, wherein said device for the thermal deburring of workpieces is configured to treat a workpiece under a pressure of at least 200 bar.

* * * * *